March 5, 1929. D. E. NASH 1,704,403
CONTROLLING APPARATUS FOR LOW PRESSURE STEAM TURBINES
Filed May 29, 1926 3 Sheets-Sheet 2

INVENTOR
Douglas E. Nash
BY
Southgate Fay & Hawley
ATTORNEYS

March 5, 1929.  D. E. NASH  1,704,403
CONTROLLING APPARATUS FOR LOW PRESSURE STEAM TURBINES
Filed May 29, 1926  3 Sheets-Sheet 3
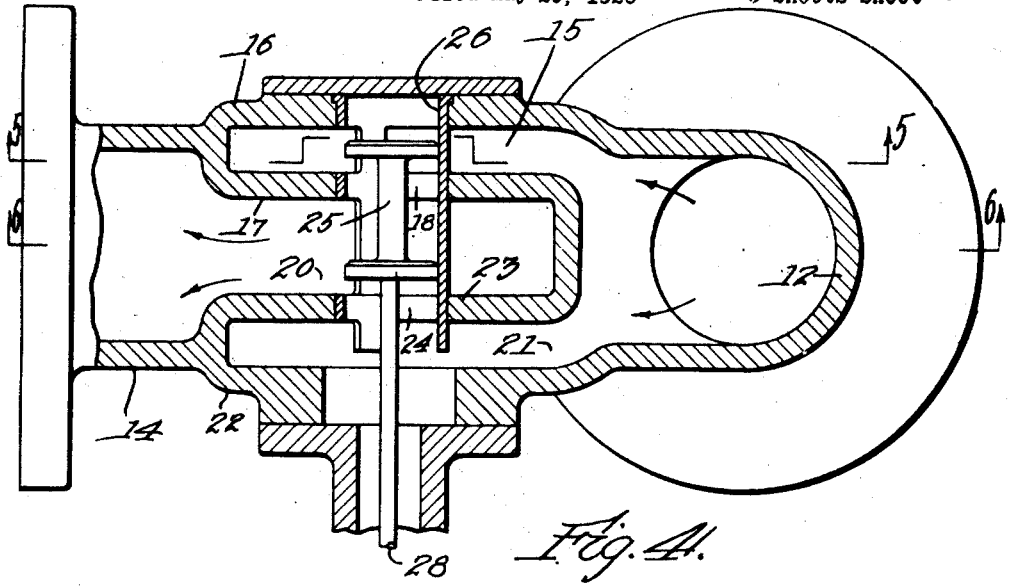
Fig. 4.
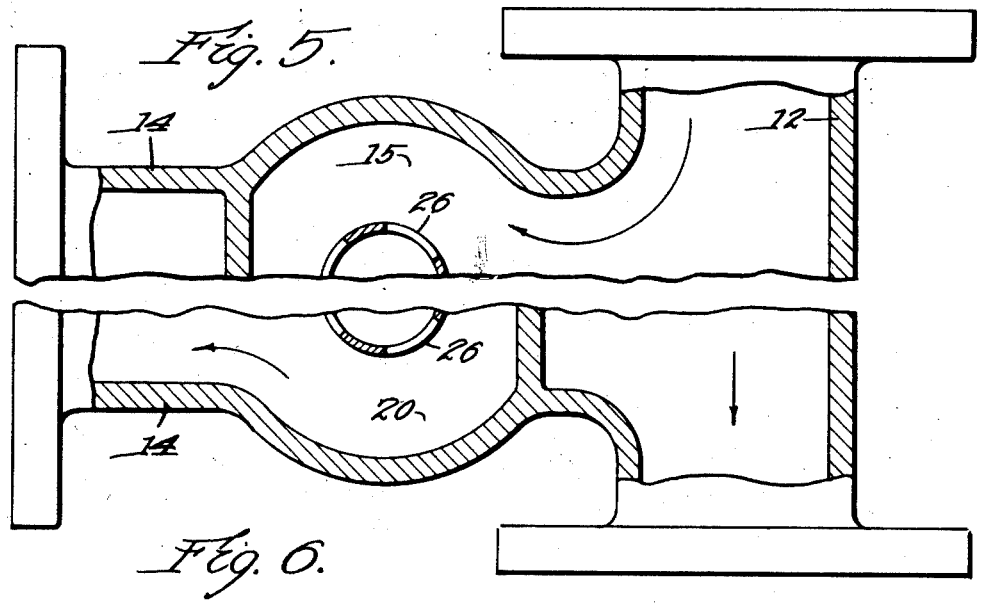
Fig. 5.
Fig. 6.
INVENTOR
Douglas E. Nash
BY
ATTORNEYS Patented Mar. 5, 1929.

1,704,403

UNITED STATES PATENT OFFICE.

DOUGLAS E. NASH, OF SOUTH NORWALK, CONNECTICUT.

CONTROLLING APPARATUS FOR LOW-PRESSURE STEAM TURBINES.

Application filed May 29, 1926. Serial No. 112,710.

This invention relates to an apparatus for controlling the speed of a low pressure steam turbine. In an earlier application filed in the name of Irving C. Jennings, Serial No. 15,415, an apparatus is disclosed in which a steam turbine is adapted for use in a low pressure vacuum steam heating system and in which the speed of the turbine is controlled by a pressure regulating valve, which maintains a constant difference in pressure between the inlet and discharge sides of the turbine.

Such an arrangement does not take into account the variations in load on the turbine, such as degree of vacuum in the system or the presence or absence of return water in the separating tank. If the turbine is running without condensate in the tank, the air pump will work but the water pump will run idle, and the speed of the turbine under a constant differential pressure will unavoidably increase in a substantial and undesirable degree. The same condition exists when the turbine is removing accumulated returns at a time when there is a low vacuum in effect on the system. Under these conditions the water pump will work but there will be no substantial load on the air pump.

To remedy these conditions, it is the object of my invention to provide means for positively maintaining a constant speed of the turbine, regardless of variations in the load, while at the same time the turbine is operated upon a differential pressure system of the general type set forth in the prior Jennings application.

In the preferred form, I provide a mechanically operated governor on the turbine, such as a centrifugal governor, and connect the governor to control the differential pressure on the turbine, reducing the difference in pressure on any increase in speed above a predetermined and desired rate.

As the invention depends upon regulating the difference in pressure only, it operates independently of any increase or decrease in actual pressure on the system.

My invention further relates to arrangements and combinations of parts which will be hereinafter described and more particularly pointed out in the appended claims.

A preferred form of the invention is shown in the drawings in which

Fig. 4 is a sectional plan view, taken along the line 4—4 in Fig. 1; and

Figure 1:
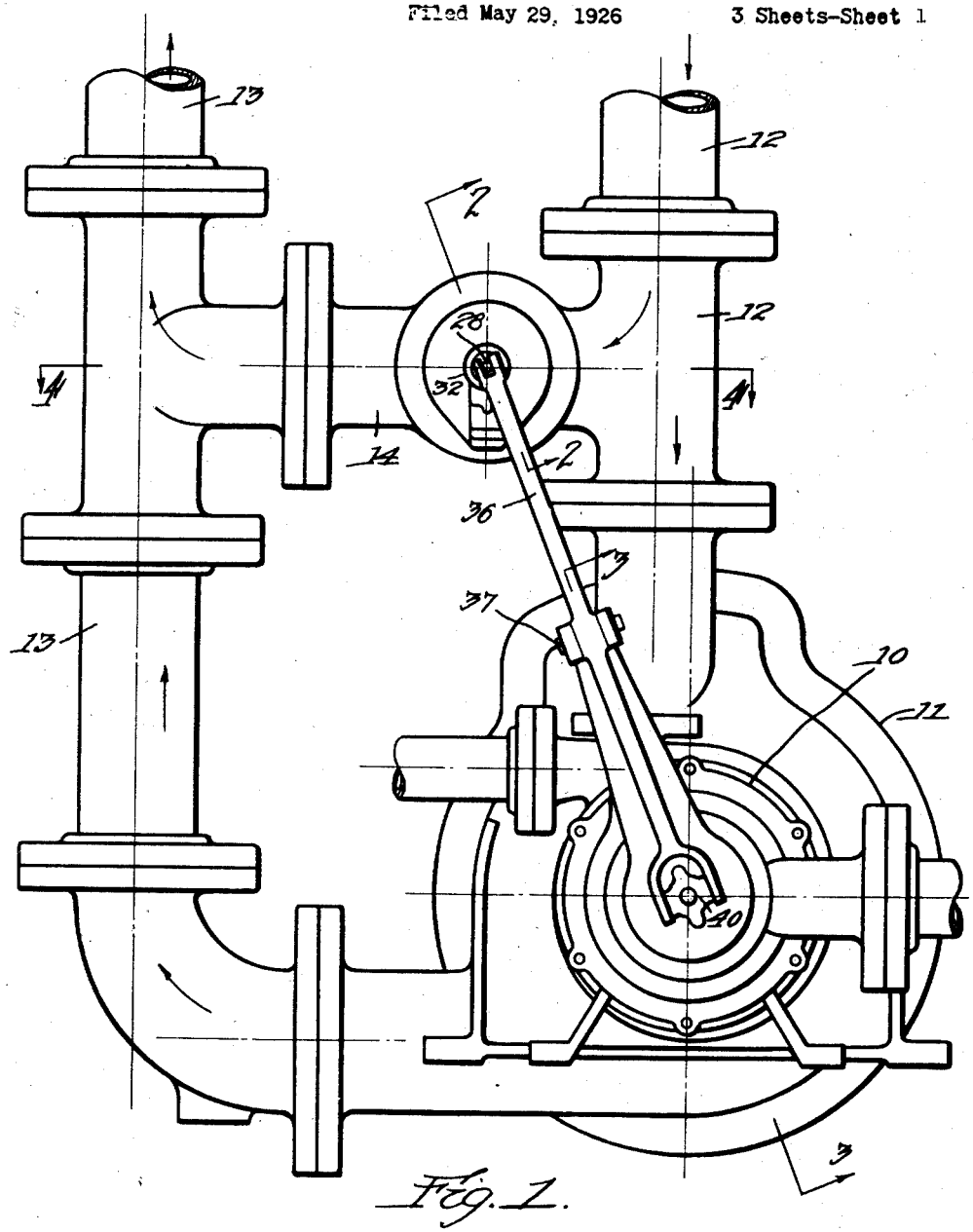
Fig. 1 is a front elevation of my improved controlling apparatus.

Figs. 5 and 6 are partial sectional front elevations, taken along the lines 5—5 and 6—6 in Fig. 4.

Referring to the drawings, I have indicated a turbine-driven pumping unit 10 for a vacuum steam heating system, said unit preferably comprising a rotary air pump to maintain the vacuum and a rotary water pump to remove the returns, both mounted upon a single shaft and driven by a direct-connected low pressure steam turbine 11.

An inlet or feed pipe 12 for the turbine 11 is connected to the steam supply of a vacuum steam heating system, and an outlet or exhaust pipe 13 from the turbine 11 is connected to discharge into the heating system, as described in the Jennings application.

A by-pass 14 is inserted between the inlet pipe 12 and the exhaust pipe 13 and is provided with internal partitions as indicated in Figs. 4, 5 and 6. The higher pressure steam from the inlet pipe 12 has free access to a chamber 15 (Fig. 4) within the by-pass connections 14, said chamber being positioned between an outer wall 16 and an inner wall 17 and said inner wall having a part 18 and connecting the chamber 15 to a middle chamber 20 which is directly connected to the exhaust pipe 13.

The inlet pipe 12 is also connected to a second inlet chamber 21 between the outer wall 22 of the by-pass and an inner wall 23 of the middle chamber. A second port 24 connects the chambers 21 and 20, and a double piston valve 25 controls the ports 18 and 24. The valve 25 is preferably guided in a sleeve 26 extending through the ports 18 and 24 and slotted at its sides to provide ample connecting passages to the chambers 15, 21 and 20.

A valve stem 28 (Fig. 2) controls the position of the double piston valve 25 and extends out of the by-pass casing through a suitable stuffing box 30 and bearing 31. A collar 32 is adjustably threaded on the end of the rod 28 and a compression spring 33 is mounted on the rod 28 between the collar 32 and a second collar 34 adjustably threaded on the bearing member 31. The spring 33 normally moves the piston valve 25 to a position in which all communication between the inlet and exhaust pipes through the by-pass connection is closed.

A lever 36 is mounted on a fixed pivot 37 and its forked upper end engages the collar 32 on the valve rod 28. At its lower end, the lever 36 is pivotally connected to a member 40 (Fig. 3) preferably having an anti-friction thrust bearing connection to a plunger 41 slidably mounted in a support 42 secured to the end of the turbine main shaft 43.

Governor weights 44 are pivoted at 45 to the support 42 which rotates with the shaft 43. Inwardly extending arms 46 of the weights 44 engage the inner end of the plunger 41 and the plunger is yieldingly forced against said arms 46 by a coil spring 47.

Figure 2:
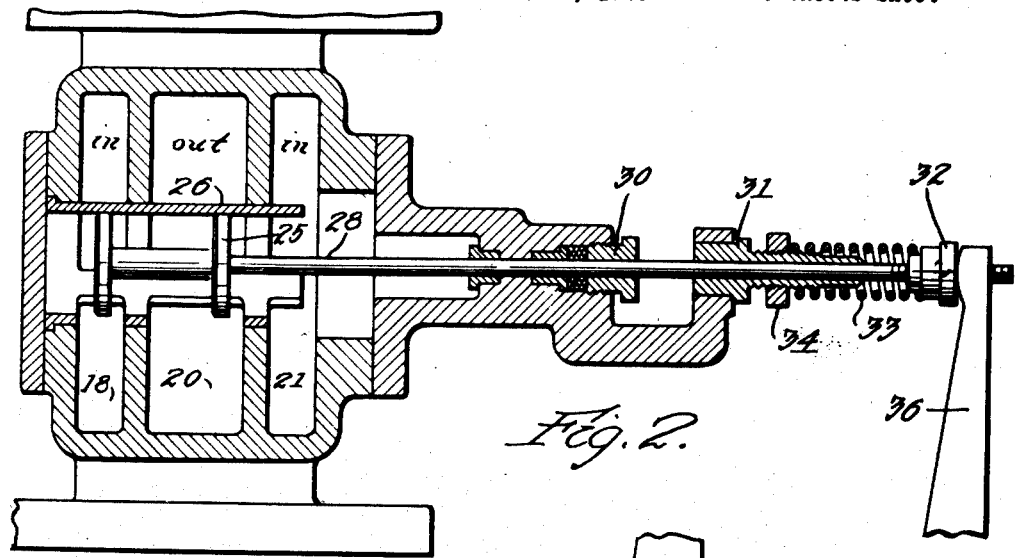
Fig. 2 is a sectional elevation of certain parts, taken along the line 2—2 in Fig. 1.
Figure 3:
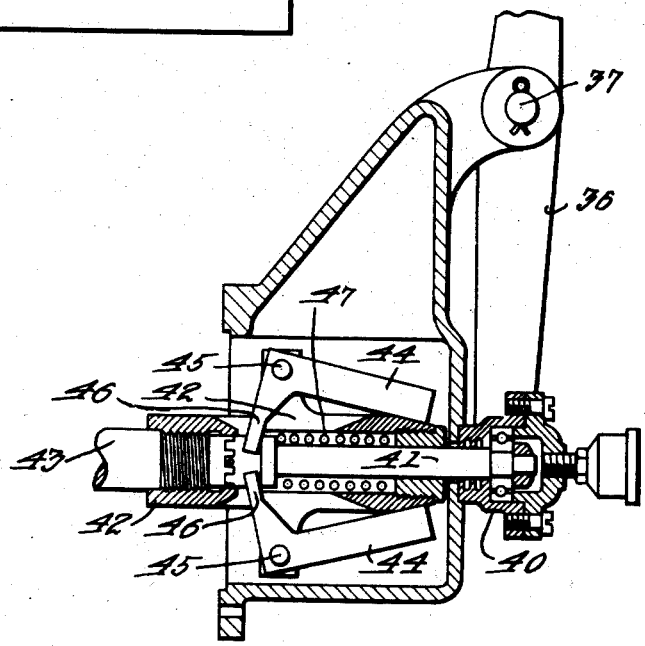
Fig. 3 is a sectional elevation of additional parts, taken along the line 3—3 in Fig. 1.

The connections are such that an increase in speed of rotation of the shaft 43 will swing the weights 44 outward, moving the plunger 41 to the right in Fig. 3, and moving the piston valve 25 inward or to the left as viewed in Fig. 2, thus opening the by-pass connection from the inlet chambers 18 and 21 to the middle or exhaust chamber 20.

Obviously, any increase in the port openings between the inlet and exhaust chambers will permit a larger amount of steam to pass through said openings, thus reducing the differential pressure between the inlet pipe 12 and the exhaust pipe 13 of the turbine and correspondingly reducing the speed of the turbine. As the steam used by the turbine decreases, the steam passing through the by-pass increases, so that the supply available for heating is not restricted.

The provision of a double piston valve 25 balances the inlet and exhaust pressures upon the piston valve and permits it to be very easily moved, regardless of the pressure on the system. Furthermore, it will be evident that the governing apparatus controls simply the difference in pressure between the inlet pipe 12 and the exhaust pipe 13, and that this difference in pressure may be maintained of any desired amount, entirely regardless of the actual operating pressures in the system. In other words, the apparatus will maintain a substantially constant speed of operation of the pump whether the fireman is running at a very low pressure in mild weather or whether he is running on a higher pressure to circulate an increased amount of steam in very cold weather.

Furthermore, the speed of rotation is controlled independently of the load upon the pump and will be maintained substantially constant, whether the air pump or the water pump is working alone or whether both pumps are under full load.

The apparatus is thus particularly effective for operating the air and water pumps of a vacuum steam heating system under the most desirable operating conditions, independently of the vacuum in the system or the quantity of returns which are to be handled by the pump.

The invention is also capable of general application to good advantage for other purposes than vacuum heating.

Having thus described my invention and the advantages thereof I do not wish to be limited to the details herein disclosed otherwise than as set forth in the claims, but what I claim is:—

1. A controlling apparatus for a low pressure turbine comprising inlet and outlet connections for said turbine, a by-pass between said connections, means to vary the effective cross-section of said by-pass, and controlling mechanism for said means, effective to maintain the speed of said turbine uniform, solely by adjustment of said means, while said inlet and outlet connections remain unchanged in condition.

2. A controlling apparatus for a low pressure turbine comprising inlet and outlet connections for said turbine, a by-pass between said connections, a regulating differential valve in said by-pass, and controlling mechanism for said valve operative in direct relation to the speed of the turbine and effective to maintain uniform speed solely by adjustment of said by-pass valve while said inlet and outlet connections remain unchanged in condition.

3. A controlling apparatus for a low pressure turbine comprising inlet and outlet connections for said turbine, a by-pass between said connections, a regulating differential valve in said by-pass, a speed controlled governor for said turbine, and connections from said governor to said valve, whereby the differential pressure on the turbine is varied by said governor to maintain constant speed entirely through movement of said differential by-pass valve and while said inlet and outlet connections remain unchanged in condition.

4. A controlling apparatus for a low pressure turbine comprising inlet and outlet connections to said turbine, a by-pass between said connections, said by-pass having a middle portion communicating with one of said connections and two side portions communicating with the other connection, ports between said middle and side portions, a double valve closing said ports and balanced as to the pressure thereon in every position of said valve and speed-controlled means to move said valve to decrease the differential pressure as the speed increases.

5. A controlling apparatus for a low pressure turbine comprising inlet and outlet connections to said turbine, a by-pass between said connections, said by-pass having a middle portion communicating with one of said connections and two side portions communicating with the other connection, ports between said middle and side portions, a double valve closing said ports and balanced as to the pressures thereon in every position of said valve, a centrifugal governor on said turbine, and mechanical connections between said governor and said balanced valve effective to move said valve to decrease the differential pressure as the speed increases.

6. A controlling apparatus for a low pressure turbine comprising inlet and outlet connections to said turbine, a by-pass between said connections, said by-pass having a middle portion communicating with one of said connections and two side portions communicating with the other connection, ports between said middle and side portions, a double valve closing said ports and balanced as to the pressures thereon in every position of said valve, and a speed-controlled governor on said turbine, said valve being moved positively by said governor in one direction to decrease the speed, and being moved yieldingly in the opposite direction to increase the speed.

In testimony whereof I have hereunto affixed my signature.

DOUGLAS E. NASH.